United States Patent [19]

Taylor et al.

[11] Patent Number: 5,422,394

[45] Date of Patent: Jun. 6, 1995

[54] WATER-BASED AUTOXIDISABLE COATING COMPOSITION

[75] Inventors: Philip L. Taylor, Burnham; Peter G. Osborn, Bourne End, both of Great Britain

[73] Assignee: Imperial Chemical Industries PLC, London, United Kingdom

[21] Appl. No.: 158,227

[22] Filed: Nov. 29, 1993

[30] Foreign Application Priority Data

Oct. 27, 1993 [GB] United Kingdom ............... 9322133

[51] Int. Cl.$^6$ .............................................. C08L 33/02
[52] U.S. Cl. ....................................... 524/558; 523/406; 524/548; 524/556; 525/119; 525/284; 525/286; 525/330.1; 526/318.42; 526/318.44
[58] Field of Search .................. 524/558, 548, 556; 525/330.1, 779, 284, 286; 526/318.42, 318.44, ; 523/406

[56] References Cited

U.S. PATENT DOCUMENTS

| | | | |
|---|---|---|---|
| 4,296,226 | 10/1981 | Braun et al. | 524/558 X |
| 4,336,172 | 6/1982 | Marguardt et al. | 524/833 X |
| 4,988,766 | 1/1991 | Das et al. | 525/330.1 X |
| 5,264,482 | 11/1993 | Taylor et al. | 524/548 |

Primary Examiner—Judy M. Reddick
Attorney, Agent, or Firm—Thomas M. Schmitz

[57] ABSTRACT

A water-based autoxidizable coating composition for application to architectural surfaces, fittings or furnishings at ambient temperatures which contains water, a drier to promote autoxidation and a water-soluble autoxidizable film-forming copolymer which contains 0.5 to 7 wt % of acrylic acid, 50 to 50 wt % of either a hydroxy acrylate chosen from hydroxy ethyl or hydroxyisopropyl acrylate or alternatively a polyethoxylate (meth)acrylate and 30 to 50 wt % of an autoxidizable ester of copolymerized acrylic acid in which the esterifying moieties are 3-allyloxy-2-hydroxypropyl or the methallyl analogue. Also an autoxidizable copolymer of the above composition. The coating composition laps well yet is water-soluble and resistant to both long term and short term damage by water. Also the copolymer for use in the compositions.

4 Claims, No Drawings

WATER-BASED AUTOXIDISABLE COATING COMPOSITION

This invention relates to a water-based autoxidisable air-drying coating composition, especially a gloss (including partial gloss) coating composition suitable for application to architectural surfaces, fittings or furnishings at ambient temperatures which composition contains water, a drier which promotes autoxidisation and a water-soluble autoxidisable film-forming addition copolymer containing copolymerised acrylic acid, copolymerised acrylate and/or methacrylate and 3-allyloxy-2-hydroxypropyl and/or its methallyl analogue. The invention further relates to water-soluble autoxidisable film-forming addition copolymer of acrylic acid partially esterified by 3-allyloxy-2-hydroxypropyl moieties or their methallyl analogues which copolymer is suitable for use in these coating compositions.

Water-based compositions are more environmentally acceptable than those based on organic solvents and nowadays even small amounts of organic cosolvent in an otherwise water-based system are unwelcome. The autoxidisable air-drying coating composition will generally be a paint, varnish, woodstain or timber preservative applicable by brush, roller, pad or spray to architectural surfaces, fittings or furnishings, that is to say surfaces usually found in buildings or on furniture. Such paints are sometimes called "decorative trim paints" because they are often used on such fittings as doors, window frames and skirting boards. A good paint for use on such surfaces should have a variety of standard properties normally expected of a decorative trim paint. Firstly it should have good opacity, that is to say it should be able to accommodate enough pigment to hide marks on the surface. Secondly it should have good flow so that it can be easily spread across the surface. Thirdly it should be easily washable (using water and detergent) from application tools, particularly from brushes and rollers. To some extent, this third requirement conflicts with the fourth which is that the applied paint should dry fast enough to achieve reasonably early resistance to water, particularly domestic condensation or spilled water. The fourth requirement in turn partially conflicts with the fifth which is that the paint must lap well at ambient temperature (say 20° C.). For gloss paints, good lapping means that when adjacent and overlapping bands of paint are applied to a substrate one after another and allowed to dry, it should be difficult for a casual observer to detect a boundary between adjacent contiguous bands of dried paint even when one band was applied several minutes after the other. The best paints lap well even when the application of adjacent contiguous bands is separated by as much as 10 minutes. The same is true for varnishes.

Up till recently, the lapping ability of water-based decorative paints has been enormously inferior to that of organic solvent-based paints, especially traditional solvent-based paints containing alkyd resin and white spirit. This inferiority was particularly noticeable with gloss or partial gloss paints, that is to say paints which dry to produce a coating having a specular gloss at an angle of 60° of at least 30% (or at least 65% for high gloss) where specular gloss at 60° is measured according to ASTM Test D523 using light reflected at an angle of 60° to the normal to the surface of the paint. Water-based air-drying gloss paints have been proposed which comprise water and an aqueous colloidal dispersion of non-autoxidisable water-insoluble film-forming polymer (including copolymers) such as for example a polymer or co-polymer of alkyl acrylate (including methacrylate). When such paints dry on a surface, the particles of polymer begin to coalesce to form a coherent film of coalesced particles which coats the surface but which dries so quickly that the particles of film-forming polymer begin to coalesce extremely quickly. This means that in practice there is not always time for a band of paint to lap with a subsequently applied adjacent contiguous band. Failure to lap creates unsightly evidence of boundaries in a gloss or semi-gloss coating.

Attempts were made to improve the lapping ability of water-based paints by using film-forming addition copolymers which were water-soluble and therefore present in the paint as a near perfect solution as opposed to being non-water-soluble and present as a dispersion of solid particles. This approach meant that film-formation was not dependant on coalescence of particles and so a major cause of poor lapping was eliminated. Unfortunately, dried films formed from water-soluble copolymers are of course vulnerable to re-dissolution by water and hence to damage by condensation or water spills. The problem could in theory be overcome by introducing autoxidisable moieties onto the film-forming copolymer so that as the film dries it also autoxidises and crosslinks to produce an insoluble macromolecule. Examples of such autoxidisable moieties include the long chain unsaturated fatty acids such as the fatty acid derived from linseed oil. The difficulty in practice was that the conventional autoxidisable moieties were very hydrophobic and so reduced the water-solubility of the copolymer.

A technique for solving the problem of how to introduce autoxidisable moieties into a film-forming copolymer whilst retaining its ability to be made water-soluble was disclosed by European Patent Specification EP 0 425 085A or corresponding U.S. Pat. No. 5,264,482, the contents of which United States Patent Application are herein incorporated by reference. EP 0 425 085A or U.S. Pat. No. 5,264,482, disclose that it is possible to introduce autoxidisable moieties into a water-soluble film-forming copolymer whilst retaining water-solubility to permit good lapping but only if a) the film-forming copolymer contained a copolymerised carboxylic acid, preferably acrylic acid,
  b) the autoxidisable moieties were the somewhat unconventional 3-allyl-2-hydroxypropyl moieties or their analogues introduced onto the film-forming copolymer by esterifying some of the acid groups using allyl glycidyl ether or its analogues (i.e. by partially esterifying the copolymer), p1 c) the film-forming copolymer contained enough acid groups to retain an acid value of 25 to 60 mgKOH/g film-forming copolymer after performance of the above partial esterification and
  d) at least 75% of the carboxylic acid groups remaining after the partial esterification were subsequently neutralised to form salts with monovalent cations such as sodium cations. The 3-allyl-2-hydroxypropyl moieties and their analogues are hydrophobic like conventional autoxidisable groups of this type and so they too adversely affect the water-solubility of the film-forming copolymer. However, their effect on water-solubility was found to be less than was experienced with conventional autoxidisable moieties, probably owing to the presence of the ether link and of a hydroxyl group close to the carboxylic ester group. Therefore despite the presence of the hydrophobic autoxidisable groups, it was possible to impart the required degree of water-solubility to the highly acidic film-forming carboxylic acid addition copolymers used by EP 0 425 085A or U.S. Pat. No. 5,264,482 by neutralising a large proportion of the remaining acid groups with monovalent cations.

The techniques disclosed by EP 0 425 085A or U.S. Pat. No. 5,264,482 produce a paint having improved lapping ability together with improved early resistance to disfiguration by water. However, it has been found that the dried coatings (even when crosslinked) imbibe water creating two problems. The first is that the imbibed water softens the dried coating increasing its vulnerability to mechanical damage for example by scratching and scuffing. The second problem occurs if a further coat of water-based paint is applied to the dried coating for then the dried coating imbibes and extracts water from the further coat causing the further coat to suffer a premature increase in viscosity which recreates a risk of poor lapping and also makes the paint more difficult to spread.

It has now been discovered that the imbibing problem is caused by the cationic water-solubilising moieties which remain in the dried film. Non-ionic water-solubilising moieties such as methoxypoly(ethylene glycol) methacrylates are sometimes used to impart water-solubility to addition copolymers. However attempts to use them instead of the cationic water-solubilising moieties in autoxidisable copolymers containing 3-allyloxy-2-hydroxypropyl moieties were unsuccessful because in order to achieve the required degree of water-solubility, they had to be used in such large amounts that they re-introduced the imbibing problem.

An object of this invention is to provide a water-based autoxidisable air-drying coating composition suitable for application to architectural surfaces, fittings or furnishings at ambient temperatures which contains water, a drier which promotes autoxidation and a water-soluble autoxidisable film-forming copolymer containing 3-allyloxy-2-hydroxypropyl moieties or its methallyl analogue which achieves water-solubility without reliance on water-solubilising cationic moieties or methoxypoly(ethylene glycol) methacrylates and so combines good lapping ability with improved resistance to the imbibing of water into the dried coating. Another object of the invention is to provide such a water-soluble copolymer for use in the invention.

Accordingly, this invention provides a water-based autoxidisable air-drying coating composition suitable for application to architectural surfaces, fittings or furnishings at ambient temperatures which composition contains water, a drier which promotes autoxidation and a water-soluble autoxidisable film-forming addition copolymer containing copolymerised acrylic acid, copolymerised acrylate and/or methacrylate and autoxidisable ester of copolymerised acrylic acid in which the autoxidisable esterifying moieties are chosen from 3-allyloxy-2-hydroxypropyl and/or its methallyl analogue (i.e.

$$CH_2=CH-(CH_2)_n-O-CH_2-CH(OH)-CH_2-$$

where n is 1 or 2) wherein the copolymer contains
a) 0.5 to 7 wt % of the copolymerised acrylic acid,
b) 50 to 70 wt % of copolymerised acrylate and/or methacrylate chosen from the following hydroxy esters
  i) hydroxyethyl acrylate,
  ii) hydroxyisopropyl acrylate,
  iii) polyethoxylate acrylates in which the polyethoxylate group contains a number average of from 1 to 10 ethoxylate groups and/or
  iv) polyethoxylate methacrylates in which the polyethoxylate group contains a number average of from 4 to 10 ethoxylate groups and
c) 30 to 50 wt % of the autoxidisable ester of copolymerised acrylic acid, the percentages being based on the combined weights of the copolymerised acrylic acid, hydroxy ester and autoxidisable ester.

The coating compositions of this invention are at least as good as those of EP 0 425 085A and U.S. Pat. No. 5,264,482 in their ability to give opacity, to spread over a surface and to lap. However, in addition they form dried films having a substantially improved resistance to the imbibing of water together with improved short and long term resistance to domestic condensation and spilled water. It is thought that the improvements may be achieved because the pendant hydroxyl groups in the acrylate or methacrylate interact in some way with adjacent copolymer chains possibly because of free radical action or because of attraction to carboxylic acid groups. Whatever the interaction may be, it seems to be essentially irreversible for all practical purposes.

Good lapping requires that the film-forming copolymer be dissolved in the aqueous component of the coating composition as opposed to merely being present as a dispersion of solid (including swollen) particles. However like most macromolecules, the film-forming copolymers of this invention form a near perfect solution rather than a perfect solution as is evidenced by the fact that, whilst solutions may often appear fully transparent to the unaided eye they usually scatter light to a small extent. However, near perfect solutions have the important property of showing a mainly monotonic increase in viscosity as they dry. A monotonic increase in viscosity is essential if the coating compositions are to be applicable in a conventional way.

Coating compositions of this invention need not contain organic cosolvents. However the presence of a small amount (preferably 1 to 15 wt % of the composition) of co-solvent may improve the clarity of some copolymer solutions and it also helps to control the viscosity of the composition as it dries. The cosolvent should be a water-miscible liquid which plasticises the film-forming copolymer and preferably has a boiling point of from 75° to 200° C. at 1 bar absolute. An ideal cosolvent should also be of low odour and low toxicity and it should have a high flash point (preferably at least 30° C.). It is useful to choose cosolvents which can act as a chain transfer agent during copolymerisation of the acid and non-acid comonomers. Examples of useful cosolvents include alcohols, glycols, ester alcohols, ether alcohols and the esters of ether alcohols, for example n-butanol, propylene glycol, benzyl alcohol, 2,2,4 trimethylpentane 1,3 diomonoisobutyrate, propylene glycol monomethyl, -ethyl, -propyl and -butyl ether, diethylene glycol, dipropylene glycol, dipropylene glycol methyl ether, diethylene glycol ethyl ether, and most preferably 1-methoxy-2-hydroxy propane or MHP which is

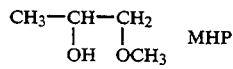 MHP

The autoxidisable film-forming copolymers of this invention do not need to be neutralised by cations to make them water-soluble. However their water-solubility can be increased by such neutralisation if some loss of resistance to water-imbibing can be tolerated. It is preferred not to neutralise more than 5% of available carboxylic acid groups in order to minimise the risk of totally losing an important advantage given by this invention.

The autoxidisable film-forming copolymer is derivable by addition copolymerising the acrylic acid with the hydroxy ester to form a pre-copolymer containing from about 15 to 28 wt % of copolymerised acrylic acid and then esterifying some of the copolymerised acrylic acid by condensing it with allyl glycidyl ether or its methallyl analogue. The condensation introduces the autoxidisable esterifying moieties which convert the pre-copolymer to an autoxidisable copolymer according to this invention. Prior to partial esterification, the pre-copolymer preferably has a weight average molecular weight of from 3,000 to 30,000 and usually below 15,000. After partial esterification, the molecular weight may increase to 4,000 to 50,000.

The autoxidisable moieties confer long term water resistance on the dried coatings by generating crosslinks in the presence of driers which promote oxidation. Typical driers include cobalt acetate, octoate or naphthanate. Too much autoxidisable ester will diminish the water-solubility of the copolymer and too little will fail to achieve long term water-resistance. The most preferred proportions are 34 to 44 wt % and the allyloxy moiety is the more preferred.

The amount of residual unesterified copolymerised acrylic acid remaining in the autoxidisable copolymer after partial esterification has been completed will not exceed about 7 wt %. The presence of larger residual amounts of acid would only be achievable by use of a pre-copolymer which contained a much larger proportion of acrylic acid and copolymers containing such high proportions of acrylic acid have been found to be impracticable to make on a commercial plant. Amounts of residual acrylic acid below 0.5 wt % reduce the opportunities for interactions of the kind thought to be responsible for improved resistance to the imbibing of water. In addition, it is convenient to have available a certain proportion of copolymerised acrylic acid for the attaching of thixotropic moieties as described in European Patent Specification EP 0 435 428B or its corresponding U.S. Pat. No. 5,164,449, the contents of which United States Patent are herein incorporated by reference.

Attempts to use methacrylic acid as an alternative to acrylic acid produced copolymers of unmanageable viscosity.

The autoxidisable copolymer should not contain more than about 70 wt % of the hydroxy ester for then there would be insufficient accommodation for enough of the copolymerised acrylic acid. On the other hand, the copolymer should contain at least 50 wt % of the hydroxy ester in order to achieve acceptable water solubility. Hydroxyethyl acrylate is the preferred hydroxy ester because it gives better long term water-resistance, harder films, better gloss and better water-solubility. The polyethoxylate acrylates and methacrylates give more water-soluble copolymers than hydroxyisopropyl acrylate. The polyethoxylate chains have the general formula

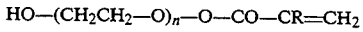

where R is H or $CH_3$ where n has a number average of from 1 to 10 when R is H or 4 to 10 when R is $CH_3$. Preferably n is 6 to 8. Attempts to use hydroxyethyl methacrylate or polypropoxylate acrylates or methacrylates as the hydroxy esters failed to produce acceptably water-soluble autoxidisable copolymers. The preferred amounts of hydroxy ester are 55 to 65 wt %.

The coating compositions usually have a total non-volatile content (including for example pigment) of from 10 to 70 wt % of the composition. Non-volatile content is determined according to the procedure of ASTM Test D 1210-9 performed at 150° C. of 210° C. if there is present a cosolvent having a boiling point above 150° C. The contents of this Test are herein incorporated by reference. The total nonvolatile content is generally 30 to 60 wt % for gloss paints, 30 to 70 wt % for partial gloss paints, 10 to 50 wt % for varnishes and 10 to 30 wt % for woodstains and timber preservatives. Depending on the type of coating composition required, from 10 to 100 wt % of the total non-volatile content may consist of the film-forming copolymer. Preferably for gloss paints, from 20 to 75 wt % of the total non-volatile content of the composition is film-forming copolymer and the corresponding preferred ranges for partial gloss paints, varnishes and woodstain or timber preservative are 10 to 60 wt %, 20 to 200 wt % and 20 to 100 wt % respectively.

The coating compositions may additionally contain components conventionally used in making for example paints, varnishes, woodstains or timber preservatives. Such components include pigments, dyes, extenders, thickeners, fungicides, anti-skinning agents, flow improvers and drying agents and solid particles of insoluble organic polymeric material as disclosed in EP 0 425 085A or U.S. Pat. No. 5,264,482. The coating compositions have also been found to have a good ability to soak into wood and so they are useful as woodstains and timber preservatives.

The various Assessments, Tests and Measurements used were performed as follows:

Epoxide Value Measurement Technique:

The epoxide value of a copolymer is determined by adding cetyl trimethyl ammonium bromide and crystal violet indicator to a sample of the copolymer dissolved in glacial acetic acid and then titrating the solution against 0.1M perchloric acid until the indicator turns from violet to yellow. Epoxide value is expressed as:

$$\frac{5.61 \times V}{W}$$

where V is the volume of perchloric acid used and W is the weight of copolymer originally in the solution.

Lapping Test:

Firstly a test surface is prepared by coating a rectangular sheet of plasterboard with a coat of a conventional water-based white acrylic primer undercoat available as "Dulux" White Quick-Drying Wood Primer Undercoat from the Paints Division of Imperial Chemical Industries PLC (ICI). The undercoat is allowed to dry for 24 hours and then there is applied to it two coats of a conventional white-spirit-based white alkyd gloss paint also available from ICI as "Dulux" Brilliant White Gloss. The top coat is allowed to dry and age for at least 7 days to produce the test surface on which the lapping tests can be performed. The tests are performed at a temperature of from 20° C. to 23° C. and at a relative humidity of from 40 to 60%.

A coat of paint under test is applied by brush by an experienced professional painter to a band about 200 mm wide of the test surface. Two minutes later, the paint under test is similarly applied to a further portion of the test surface which lies adjacent to the band and the ability of the paint to lap with that of the band is assessed. Six further similarly adjacent portions are similarly painted one after another at about 2 minute intervals and the ability of their paint to lap with that of the band is also assessed. In this way, the painter can assess the ability of the paint to lap over a period of 2 to 14 minutes and compare it with the lapping ability of a conventional organic solvent-borne gloss subjected to the same test.

Good lapping occurs when no boundary can be seen between the paint of the band and that of an adjacent portion. A conventional organic solvent-borne paint will show no evidence of a boundary even when the adjacent portion is painted 15 minutes after the band. The painter assesses the lapping ability of a paint on a scale of from 1 (good) to 5 (unacceptable) with the conventional alkyd paint being arbitrarily assigned to a score of 3.

Long Term Weather Resistance Test:

A deal panel was brush painted with the acrylic primer used in the Lapping Test described above and the coating was allowed to dry for 24 hours. A first coat of test paint was applied by brush by an experienced professional painter to the primed panel and allowed to dry for 24 hours. A second coat of the test paint was similarly applied and allowed to dry for one week. The panel was then mounted outdoors inclined at an angle of 45° to the vertical and facing South in Slough, England. It was exposed to the weather for 3 months during Spring. The coating was then assessed visually for disfiguration and assessed on a scale of 1 (good) to 5 (unacceptable). The coating was also tested for loss of hardness by attempting to mark it by pressing the edge of a thumb nail into it.

Molecular Weight Measurement:

Weight average molecular weights are measured by making a solution consisting of 0.5 wt % copolymer in 99.5 wt % tetrahydrofuran and subjecting the solution to gel permeation chromatography using a pair of 300 mm linear columns arranged in series and packed with 5 micron polystyrene gel supplied by Polymer Laboratories Ltd of Church Stretton, England. The results obtained are calibrated against a polystyrene standard.

Re-coating Test:

The ability of a dry coat of test paint to receive a second coat of the same test paint is assessed as follows:

A coating of test paint was applied by an experienced professional painter to a dry alkyd gloss coated test surface obtained as in the Lapping Test described above. Twenty four hours later, a second coating of the test paint was similarly applied and its ease of application was observed. ps Water Spot Resistance Test:

The resistance of a freshly applied coating to disfiguration by water is assessed as follows:

A coating 100 μm thick is applied to a dry coat of a conventional alkyd paint obtained as in the lapping test described above. The coating is allowed to dry for 24 hours at 8° C. and 50% relative humidity. Then a 1 ml drop of water is deposited onto it, covered by a watch glass and allowed to stand at 8° C. for two hours. Then the glass is removed and the sample is immediately wiped dry and examined for disfiguration. It was assessed according to the following scale:

1. No disfiguration
2. Slight marking
3. Microblistering
4. Slight blistering
5. Blistering
6. Severe Blistering
7. Severe Blistering plus some shrivelling
8. Severe Shrivelling
9. Coating partially removed
10. Coating totally removed.

This test is more severe than that quoted in EP 0 425 085A or U.S. Pat. No. 5,264,482 being performed at 8° C. instead of 20° C. to take account of the fact that painting is often done in cold weather.

EXAMPLE 1 AND COMPARATIVE EXAMPLES A AND B

Preparation of an Autoxidisable Copolymer containing Hydroxyethyl Acrylate:

a) Preparation of a Pre-copolymer:

A pre-copolymer consisting of 21 wt % of copolymerised acrylic acid and 79 wt % of copolymerised hydroxyethyl acrylate was made by a free-radical initiated addition copolymerisation using butyl peroxy-2-ethyl hexanoate as the free radical initiator. The half-life of the initiator at 125° C. is 1.7 minutes.

The copolymerisation was performed in 928 g of 1-methoxy-2-hydroxy propane (MHP) organic solvent refluxing at 120° to 130° C. 268 g of acrylic acid and 1380 g of hydroxyethyl acrylate were mixed together and fed dropwise to the refluxing MHP over a period of 5 hours. A solution of 87.4 g of the initiator in 57.0 g MHP was also fed dropwise to the MHP over the same 5 hour period. Refluxing was continued for a further 15 minutes after feeding of the co-monomers and initiators had been completed whereupon a further solution of 17.5 g initiator was added and the reaction continued for a further 30 minutes to ensure completion of the copolymerisation. A solution of the pre-copolymer in MHP was obtained and allowed to cool to ambient (18°C.) temperature. The pre-copolymer had a number average molecular weight of 2 700.

b) Preparation of an Autoxidisable Film-Forming Copolymer:

The solution of pre-copolymer obtained above was converted to an autoxidisable film-forming copolymer by condensing allyl glycidyl ether with some of the carboxylic acid groups of the copolymerised acrylic acid thereby partially esterifying the pre-copolymer with 3-allyloxy-2-hydroxypropyl moieties. The condensation is catalysed by benzyl trimethyl ammonium hydroxide which is an epoxide ring-opening catalyst. The condensation was performed by first re-heating the pre-copolymer solution to 118° to 120° C. Then 8.3 g of the ring-opening catalyst was added and washed in with 16.0 g MHP. Next 551.9 g allyl glycidyl ether in 32.2 g MHP was added dropwise over a period of 30 minutes. The solution was then re-heated up to its refluxing temperature, maintained there till its Epoxide Value had fallen to below 3 mgKOH/(g non-volatile contents of the solution) and then allowed to cool to ambient temperature. The solution had a non-volatiles content of 66.7 wt % and contained an autoxidisable film-forming copolymer consisting of 1.6 wt % acrylic acid, 60 wt % copolymerised hydroxyethyl acrylate and 38.4 wt % of the 3-allyloxy-2-hydroxypropyl ester of copolymerised acrylic acid. The copolymer had a theoretical acid value of 6.6 mgKOH/g copolymer and a weight average molecular weight of 29,000.

c) Preparation of an Autoxidisable Air-Drying Paint:

The solution of the copolymer obtained above was re-heated to 60° C. and some of its MHP was removed by subjecting it to a vacuum of 0.1 to 0.2 bar and then increasing its temperature by increments of 5° to 90° C. over a period of 30 minutes. A concentrated solution was obtained which consisted of 90 wt % copolymer and 10 wt % MHP. The concentrated solution was allowed to cool to 70° to 80° C. whereupon 43.2 vol % of water (based on the volume of concentrated solution) was added to it to produce an aqueous solution consisting of 70 vol % copolymer, 25.5 vol % water and 4.5 vol % (4.1 wt %) MHP. The aqueous solution was clear to the unaided eye and a small sample showed a monotonic increase in viscosity on drying. The main volume of the solution was divided into two halves.

The first half of the solution was poured into a 2.5 liter high speed disperser fitted with a conventional 60 mm diameter apertured circular stirrer. The stirrer was rotated to 3000 rpm and then 0.06 vol % of a conventional anti-foaming composition followed by 22 vol % titanium dioxide particles followed by 3 vol % of water were all added to the aqueous solution in the disperser. The volume percentages were based on the volume of solution in the disperser prior to the addition of the anti-foaming agent. The titanium dioxide was a pigment grade rutile of number average particle size 2401 nm. Rotation of the stirrer was continued for 30 minutes after the addition of the water whereupon there was obtained a thoroughly mixed dispersion of rutile particles in aqueous copolymer solution.

The dispersion was transferred to a 2.5 liter slow speed mixer fitted with a 60 mm stirrer and the stirrer was rotated at 200 rpm. Next, 0.5 vol % (based on the volume of the dispersion in the mixer) of the conventional anti-foaming agent was added to the dispersion in the mixer followed by the second half of the aqueous solution and by 0.2 wt % cobalt metal as cobalt octoate drier where the weight percentage is based on the total weight of copolymer in the two halves of the aqueous solution. Next 17.3 vol % (based on the volume of the contents now in the mixer) of an aqueous dispersion of conventional acrylic copolymer particles was added to the contents of the mixer. The particles had a number average particle size of 231 nm and consisted of an acrylic copolymer containing 43.2 wt % methyl methacrylate, 50.7 wt % 2-ethylhexyl acrylate and 6.2 wt % methyoxy poly(ethylene glycol) methacrylate and which had a weight average molecular weight of 68,000 and a minimum film forming temperature of −15° C. The acrylic particles can be made according to Example 19 of EP 0 425 085 A or U.S. Pat. No. 5,264,482 and they serve to improve the gloss of the dried coating.

Stirring was continued for 30 minutes after the addition of the acrylic particles whereupon a paint according to this invention was obtained. The paint was thinned (i.e. diluted) with water to achieve a cone and plate viscosity of 0.25 pascal (2.5 poise) in order to facilitate its use as a paint.

d) Performance of the Thinned Paint:

The thinned paint was subject to the Lapping Test, the Long Term Weathering Test, the Water Spot Test and the Re-coating Test. The results are shown in Tables 1 to 4 together with corresponding results obtained for a conventional organic solvent-borne alkyd paint (Comparative Example A) and a paint made according to Example 19 to EP 0 425 085A or U.S. Pat. No. 5,264,482 (Comparative Example B).

TABLE 1

LAPPING ABILITY
LONG TERM WEATHER RESISTANCE
WATER SPOT RESISTANCE

| Example | Lapping Assessment | Long Term Weather Resistance Assessment | Thumb Nail Test | Water Spot Resistance Rating |
|---|---|---|---|---|
| 1 | 4 | 2 | Unmarked | 3 |
| A | 3 | 2 | Unmarked | 1 |
| B | 5 | 3 | Marked | 10 |
| 2 | 4 | 2 | Slightly | 3 |

A is conventional alkyd paint
B is paint from Example 19 of EP 0 425 085A

TABLE 2

RE-COATING TEST

| Example | Observations |
|---|---|
| 1 | Second Coat applied easily |
| A | Second Coat applied easily |
| B | Second Coat broke down on surface causing precipitation of copolymer and total loss of flow |
| 2 | Second coat applied easily |

COMPARATIVE EXAMPLES C AND D

Attempts to use Alternative Co-monomers when making the Pre-copolymer:

Attempts were made to repeat the procedure of Example 1 using in Comparative Example C hydroxyethyl methacrylate instead of hydroxyethyl acrylate or in Comparative Example D, methacrylic acid instead of acrylic acid. In both cases, the attempts resulted, in the formation of an unusable viscous composition.

EXAMPLE 2

Preparation of an Alternative Autoxidisable Copolymer containing a Polyethoxylate Methacrylate having a Number Average of Six Ethoxylate Groups:

a) Preparation of the Pre-copolymer:

A pre-copolymer consisting of 31 wt % of copolymerised acrylic acid and 69 wt % of a copolymerised hydroxy ester which was a polyethoxylate methacrylate having polyethoxylate chains containing a number average of six ethoxylate groups was made by a free-radical initiated addition copolymerisation using butyl peroxy-2-ethyl hexanoate as the free radical initiator.

The copolymerisation was performed in 995 g of MHP refluxing at 120° to 130° C. 317 g of acrylic acid, 105 g of the polyethoxylate methacrylate, 21.6 g mercaptopropyl trimethoxysilane chain transfer agent and 41 g of initiator dissolved in MHP were fed separately to the refluxing MHP over a period of two hours. Then a further 159 g of acrylic acid 10.8 g of the chain transfer agent and 4.8 g of initiator in MHP were added separately over a further hour. Refluxing was continued and 15 minutes later a further solution of 15.3 g initiator in MHP was added followed by a further 30 minutes of refluxing to ensure completion of the copolymerisation. A solution of pre-copolymer in MHP was obtained and allowed to cool to ambient (18° C.) temperature. The pre-copolymer had a number average molecular weight of 2380.

b) Preparation of Autoxidisable Film-Forming Copolymer:

The solution of pre-copolymer obtained above was converted to an autoxidisable film-forming copolymer using the procedure of part b of Example 1 except that 8.8 g of ring opening catalyst and 575 g of allyl glycidyl ether were used and the autoxidisable copolymer obtained contained 5.5 wt % acrylic acid, 50 wt % polyethoxylate methacrylate and 44.5 wt % of the 3-allyloxy-2-hydroxypropyl ester of copolymerised acrylic acid.

c) Preparation of an Autoxidisable Air-Drying. Paint:

An autoxidisable air drying paint was prepared according to the procedure of part c Example 1. The paint was then thinned as in Example 1 and subjected to the tests listed in Table 1 and the results obtained are shown in Table 1.

EXAMPLE 3

Preparation of an Autoxidisable Copolymer containing a Polyoxymethacrylate Methacrylate having a Number Average of Seven Ethoxylate Groups:

A pre-copolymer consisting of 68.9 wt % copolymerised acrylic acid and 31.1 wt % of a copolymerised hydroxy ester which was a polyethoxylate methacrylate having polyethoxylate chains containing a number average of seven ethoxylate groups was made by a free-radical initiated addition copolymerisation using butyl peroxy-2-ethyl hexanoate as the free radical initiator and mercaptopropyl trimethoxysilane as a chain transfer agent.

The copolymerisation was performed in 300 g of MHP refluxing at 120° to 130° C. 179 g of acrylic acid, 395 g of the polyethoxylate methacrylate and 12.2 g of the chain transfer agent were mixed together and the mixture was fed to the refluxing MHP over a period of 3 hours. A solution of 17.3 g of the initiator dissolved in 74 g of MHP was also fed separately to the refluxing MHP over the same period of 3 hours. Refluxing was continued and 15 minutes later a further 5.7 g of initiator dissolved in MHP was added to the refluxing MHP over a period of 30 minutes followed by a further 15 minutes of refluxing to ensure completion of the copolymerisation. A solution of pre-copolymer in MHP was obtained and allowed to cool to ambient (18° C.) temperature. The pre-copolymer had a number average molecular weight of 2790.

The solution of pre-copolymer obtained above was converted to an autoxidisable copolymer using the procedure of part b of Example 1 except that 3.3 g of ring opening catalyst and 216 g of allyl glycidyl ether were used and the autoxidisable copolymer obtained contained 5.3 wt % acrylic acid, 50 wt % of the polyethoxylate methacrylate and 44.7 wt % of the 3-allyloxy-2-hydroxypropyl ester of copolymerised acrylic acid.

The autoxidisable copolymer obtained was less soluble than that obtained from Example 2 but it was nevertheless capable of use as a paint made in accordance with part c of Example 1.

EXAMPLE 4

Preparation of an Autoxidisable Copolymer containing a Polyoxymethacrylate Methacrylate having a Number Average of Eight Ethoxylate Groups:

A pre-copolymer consisting of 31.1 wt % copolymerised acrylic acid and 68.9 wt % of a copolymerised hydroxy ester which was a polyethoxylate methacrylate having polyethoxylate chains containing a number average of eight ethoxylate groups was made by a free-radical initiated addition copolymerisation using butyl peroxy-2-ethyl hexanoate as the free radical initiator and mercaptopropyl trimethoxysilane as a chain transfer agent.

The copolymerisation was performed in 374 g of MHP refluxing at 120° to 130° C. 179 g of acrylic acid, 395 g of the polyethoxylate methacrylate and 12.2 g of the chain transfer agent and 17.3 g of initiator in MHP were mixed together and the mixture was fed to the refluxing MHP over a period of 3 hours. Refluxing was continued and 15 minutes later a further 5.7 g of initiator dissolved in MHP was added to the refluxing MHP over a period of 30 minutes followed by a further 15 minutes of refluxing to ensure completion of the copolymerisation. A solution of pre-copolymer in MHP was obtained and allowed to cool to ambient (18° C.) temperature.

The solution of pre-copolymer obtained above was converted to an autoxidisable copolymer using the procedure of part b of Example 1 except that 3.3 g of ring opening catalyst and 216 g of allyl glycidyl ether were used and the autoxidisable copolymer obtained contained 5.3 wt % acrylic acid, 50 wt % of the polyethoxylate methacrylate and 44.7 wt % of the 3-allyloxy-2-hydroxypropyl ester of copolymerised acrylic acid.

The autoxidisable copolymer obtained was less soluble than that obtained from Example 2 but it was nevertheless capable of use as a paint made in accordance with part c of Example 1.

EXAMPLE 5

Preparation of an Alternative Autoxidisable Copolymer containing Hydroxyisopropyl Acrylate:
Preparation of the Pre-copolymer:

A pre-copolymer consisting of 23.8 wt % of copolymerised acrylic acid and 76.2 wt % of copolymerised hydroxyisopropyl acrylate was made by free radical addition copolymerisation as in Example 1. The copolymerisation was performed in 382 g of MHP to which was added a mixture of 143 g acrylic and 458 g hydroxyisopropyl acrylate and also 18 g initiator in MHP all added steadily over a period of three hours followed by a further 15 minutes of refluxing. Then an extra 6 g of initiator in MHP was added and refluxing again continued for a further 30 minutes to ensure completion of the copolymerisation. A solution of pre-copolymer in MHP was obtained and then allowed to cool to ambient temperature.

b) Preparation of an Autoxidisable Film-Forming Copolymer:

The solution of pre-copolymer obtained above was converted to an autoxidisable copolymer using the procedure of part b of Example 1 except that 6 g of ring opening catalyst and 178 g of allyl glycidyl ether were used and the autoxidisable copolymer obtained contained 3.7 wt % acrylic acid, 58.8 wt % hydroxyisopropyl acrylate and 37.5 wt % of the 3-allyloxy-2-hydroxypropyl ester of copolymerised acrylic acid. The autoxidisable copolymer was found to be more soluble in water than that of Example 1, but when its solution in water was tested as a coating composition it was found to dry more slowly than the corresponding solution obtained in Example 1.

We claim:

1. A water-based autoxidisable air-drying coating composition suitable for application to architectural surfaces, fittings or furnishings at ambient temperatures, the composition containing water, a drier for promoting autoxidation, and a water-soluble autoxidisable film-forming addition copolymer binder, where the copolymer binder comprises on a weight basis:
   a. 0.5% to 7% of copolymerized acrylic acid;
   b. 50% to 70% of copolymerized acrylate or methacrylate monomers selected from the group consisting of
      i. hydroxyethyl acrylate,
      ii. hydroxyisopropyl acrylate,
      iii. polyethoxylate acrylate in which the polyethoxylate group contains a number average of from 1 to 10 ethoxylate groups, and
      iv. polyethoxylate methacrylate in which the polyethoxylate group contains a number average of from 4 to 10 ethoxylate groups; and
   c. 30% to 50% of autoxidisable ester of copolymerised acrylic acid in which the autozidisable esterifying moiety is $$CH_2{=}CH{-}(CH_2)_n{-}O{-}CH_2{-}CH(OH){-}CH_2{-}$$

where n is 1 or 2,
   where the copolymer binder weight percentages are based on the combined weights of the copolymerised acrylic acid, acrylate or methacrylate monomer, and autoxidisable ester.

2. A composition according to claim 1 wherein the copolymer contains from 55 to 64 wt % of hydroxy ester.

3. A composition according to claim 1 wherein the copolymer contains from 34 to 44 wt % of autoxidisable ester.

4. A composition according to claim 1 wherein the composition also contains components conventionally used in making paints, varnishes, woodstains or timber preservatives.

* * * * *